United States Patent [19]

Sun

[11] Patent Number: 5,414,266

[45] Date of Patent: May 9, 1995

[54] MEASURING SYSTEM EMPLOYING A LUMINESCENT SENSOR AND METHODS OF DESIGNING THE SYSTEM

[75] Inventor: Mei H. Sun, Los Altos, Calif.

[73] Assignee: Luxtron Corporation, Santa Clara, Calif.

[21] Appl. No.: 75,680

[22] Filed: Jun. 11, 1993

[51] Int. Cl.$^6$ .................. G01K 15/00; G01N 21/64; G08C 13/00

[52] U.S. Cl. .................. 250/459.1; 250/458.1

[58] Field of Search .................. 250/459.1, 458.1

[56] References Cited

U.S. PATENT DOCUMENTS

| | | |
|---|---|---|
| 4,652,143 | 3/1987 | Wickersheim et al. .............. 374/161 |
| 4,997,286 | 3/1991 | Fehrenbach et al. ............... 374/131 |
| 5,090,818 | 2/1992 | Kleinerman .......................... 374/131 |
| 5,107,445 | 4/1992 | Jensen et al. ......................... 364/525 |

OTHER PUBLICATIONS

K. T. V. Grattan, R. K. Selli and A. W. Palmer, "Fiber-optic absorption temperature sensor using fluorescence reference channel." *Rev. Sci. Instrum.*, vol. 57, No. 6 (Jun. 1986) pp. 1175–1178. © 1986 American Institute of Physics.

K. T. V. Grattan and A. W. Palmer, "Infrared fluorescence 'decay-time' temperature sensor." *Rev. Sci. Instrum.*, vol. 56, No. 9 (Sep. 1985) pp. 1754–1787. © 1985 American Institute of Physics.

*Primary Examiner*—Constantine Hannaher
*Attorney, Agent, or Firm*—Majestic, Parsons, Siebert & Hsue

[57] ABSTRACT

A system for measuring a parameter, such as temperature, includes a sensor of that parameter, such as a luminescent material based sensor at an end of an optical fiber, and an electro-optic module connected to the sensor, such as through the optical fiber, in order to measure changes in some sensor characteristic, such as luminescence decay time, that is related to the parameter to which the sensor is being subjected. The sensor is designed to have a relationship of such a characteristic to the parameter being measured that is matched to the ability of the module to measure the characteristic. In a temperature measurement system example, a luminescent material is chosen with decay time vs. temperature characteristics of the luminescent material matching variations of the electro-optic module decay time measurements that result from differences between various units, such as caused by variations among optical or electronic components used in the units, or variations resulting from different operating environments, such as variations in the temperature of the environment in which a given module is positioned. Proper matching of the luminescent material and module characteristics allows precision requirements heretofore imposed upon the electro-optical modules to be relaxed, and thus for substantial cost savings to be realized.

5 Claims, 2 Drawing Sheets

MEASURING SYSTEM EMPLOYING A LUMINESCENT SENSOR AND METHODS OF DESIGNING THE SYSTEM

FIELD OF THE INVENTION

This invention relates generally to the measurement of a parameter, such as temperature, and, more specifically, to the matching a parameter dependent characteristic, such as temperature dependent decay time, of a sensor, such as a luminescent material sensor, with a measuring module, such as an electro-optic module.

BACKGROUND OF THE INVENTION

A luminescent material sensor of existing temperature measuring systems is pulsed with excitation radiation, and the rate of decay of luminescence after termination of the excitation pulse is measured. This decay time is then correlated to the temperature or other parameter being measured by the luminescent material sensor. Although other temperature dependent characteristics of a wide variety of optical sensors have been suggested or incorporated into commercial temperature measuring systems, the luminescent decay time approach appears to be the most accepted.

With this approach, the luminescent material may be attached to a surface of an object whose temperature is being measured, or may be included as part of a small sensor at an end of a length of optical fiber. In the surface coating case, excitation radiation is directed onto the surface and the resulting luminescence is collected from the luminescent material layer without contacting it. In the fiberoptic sensor case, the excitation radiation is sent along the length of optical fiber from its free end to the sensor and the resulting luminescence is communicated back along the fiber from the sensor to its free end. An electro-optical system is connected to the free end of the fiber in order to provide the excitation radiation pulses and to detect and process the luminescence emission signal.

Early commercial fiberoptic sensor products using luminescence decay time technology have found their greatest use in research and development laboratories and for scientific applications. A significant advantage of a fiberoptic temperature sensor is that it is non-electrically conductive and thus can be used in environments having strong electrical or magnetic fields that precludes the use of metallic temperature sensors such as thermocouples. In order to provide high accuracy and repeatability of measurements, the instruments of these systems are rather complex and expensive.

Therefore, there has been effort in recent years to produce a practical fiberoptic temperature sensing system that is much less complex, and thus which can be manufactured and sold at a lower cost in order to compete more favorably with other forms of temperature measurement systems. In 1991, Luxtron Corporation, assignee of the present application, brought to market a much simplified product that has most of the necessary optics and electronics mounted on a single printed circuit card or board for measuring the temperature dependent decay time of an attached fiberoptic luminescent material sensor. This card can be included within larger systems where temperature measurements are required to be made for controlling operation of the systems or simply for informational purposes. A electronic signal output of the card provides the luminescent signal decay time which is then converted to temperature by an output module, a dedicated host computer or an existing computer of a larger system into which the card is installed. Alternatively, for other applications, the card can be provided with the processing necessary to output a signal giving temperature of the sensor directly. This commercial board product of Luxtron Corporation is described in its U.S. Pat. No. 5,107,445. The commercial board product of Luxtron Corporation has been using the chromium activated yttrium gallium garnet ("Cr:YGG") luminescent material described in this patent.

This board product, much simpler, smaller and less expensive than prior measuring instruments, was found to have some limitations. It is a primary object of the present invention to improve the accuracy and stability of various parameter measuring systems of which this board product is an example.

It is another object of the present invention to provide a design technique and resulting measuring system that may be implemented at a lower cost.

It is a further object of the present invention to improve the yield of accurate measurement boards during their manufacture.

SUMMARY OF THE INVENTION

These and additional objects are accomplished by the present invention wherein, briefly and generally, the accuracy and stability of a measurement system is improved, and/or the complexity and cost of its measurement module is reduced without sacrificing accuracy, by selecting its sensor to have an incremental parameter dependent characteristic that is matched to the smallest spread of that characteristic which is measured by the module. In the luminescent temperature measurement system described herein, as an example, the luminescent material chosen for the sensor has an incremental decay time characteristic that is matched to the spread of decay times that is measured by the electro-optical module of the system when subjected to a single decay time optical signal.

Prior attempts to improve the accuracy and stability of the existing board electro-optical system described above have been directed toward improving the electronic system contained on each board. This approach, however, tends to make the measurement board more complex and expensive than desired. Indeed, a simpler, less expensive measurement board is desired instead.

One cause of the inaccuracies described above appears to be a lack of conformity among module boards in a group of boards. A variation of the measurements made by such a group of boards was found to exist when each of the boards in the group was presented with a luminescent signal having the same decay time. This is apparently due, at least in large part, to differences between copies of the same optical and electronic components used on the boards. This lack of conformity has been overcome by individually calibrating each board during the manufacturing process and loading into their individual memories one of a number of different calibration tables that best provides necessary compensation for that individual board. The necessity for such individual calibration, of course, increases the cost of the boards.

Another inaccuracy of measurement of this board product was found to be due to an instability of the boards. When individual units were used in an environment whose ambient temperature varied widely, the measurement deviated from the calibration. This has resulted in limiting somewhat the environments in which the board product can be used, or, alternatively, reducing the accuracy which can be expected of the measurements. The diminished accuracy of the measurements in such circumstances appears to be due to the effects of temperature changes on the optical and electronic components used on the board. Another type of instability which needs to be taken into account is long term drift, wherein the measurements become less accurate over time as the optical, electronic and other components on the board change.

The present invention allows for improvement of the accuracy of such measuring systems without having to make the measuring modules more complex and expensive. This is done by choosing a sensor having incremental characteristics that are matched to the accuracy of the measuring modules. Further detailed aspects of the present invention are best understood from the following description, which should be read with reference to the accompanying drawings that include exemplary sensor characteristic curves.

DESCRIPTION OF THE PREFERRED EMBODIMENTS

Figure 1:
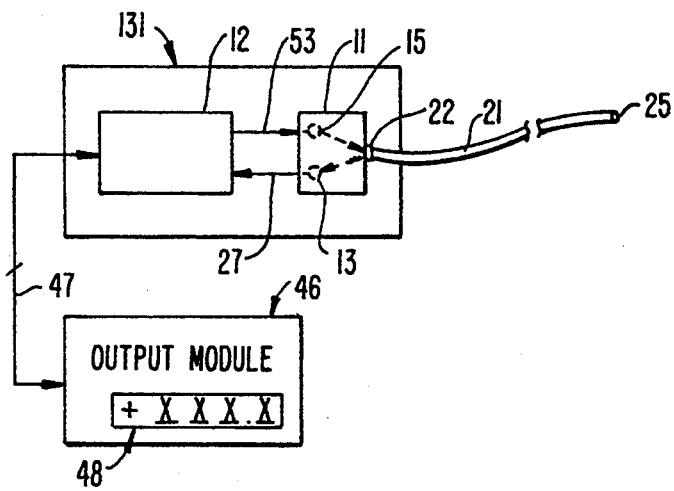
FIG. 1 schematically illustrates a temperature measuring system in which the present invention may be employed.

Referring initially to FIG. 1, an example of a fiberoptic luminescence based system incorporating the improvements of the present invention is shown. An electro-optical module is illustrated in the form of a circuit card or board 131 that is described in detail in aforementioned U.S. Pat. No. 5,107,445, and in a patent application Ser. No. 08/075,743 of Earl M. Jensen entitled "Temperature Measuring System Having Improved Signal Processing and Multiple Optical Sensors" and filed Jun. 11, 1993. The entire contents of this patent and copending application are being incorporated herein by this reference. This module is only generally outlined in the accompanying FIG. 1, those elements which are also described in U.S. Pat. No. 5,107,445 being given the same reference numbers.

An optical head 11 includes a photodetector 13, such as a photodiode or a photomultiplier, and a light emitting diode (LED) 15 as an excitation source. The photodetector 13 and excitation source 15 are coupled through an optical fiber connector 22 to one end of a length of an optical fiber communication medium 21. The medium 21 is preferably made of a single optical fiber but, alternatively, can include a bundle of fibers. A sensor 25 of a parameter to be measured, this parameter being temperature in this example, is attached to another end of the length of optical fiber 21.

An electronic system 12 includes circuitry for driving the LED 15 through a circuit 53 in order to produce a succession of radiation pulses that excite luminescent material within the sensor 25 to luminesce. In between pulses, the luminescent radiation from the sensor 25 is received by the photodetector 13, whose electrical output is connected through a circuit 27 to the electronic circuits 12. The circuits 12 determine the temperature dependant decay time of the luminescent sensor 25. A signal proportional to this measured decay time is outputted on the circuits 47. Alternatively, the electronic circuits 12 can further convert that decay time to temperature which is then outputted from the board 131.

In the typical system illustrated in FIG. 1, signals representing luminescent decay time are communicated over the circuits 47 to an output module 46 or, alternatively, a computer system. The module 46 converts the decay time values to the temperature of the sensor 25 by use of a look-up table, formula, or some other convenient means. The temperature is then registered on a visual display 48 or, alternatively, on a chart recorder or some other type of output device.

The luminescent material included in the sensor 25 desirably has certain characteristics. The material must be chemically and environmentally inert, have repeatable rates of decay when subjected to the same temperatures, be independent of the intensity of the excitation radiation, produce a measurement independent of any prior temperatures to which the sensor has been exposed and be compositionally uniform in order to avoid large spreads of decay times on account of variations among different sensors. It is highly desirable to be able to connect and disconnect various sensors from various electro-optical modules without having to perform any calibration or recalibration upon doing so.

Other requirements for a satisfactory luminescent material include a decay time over a temperature range of interest that is short enough to allow multiple measurements to be made and averaged within a short update interval but not so short that microprocessor based electronics cannot operate fast enough to process the signal. A sensor material having a bright luminescence can improve the signal-to-noise of the measurement. Another desirable characteristic of a suitable luminescent material is that it have sufficient sensitivity over the desired temperature range in order to allow good measurements to be made.

Figure 2:
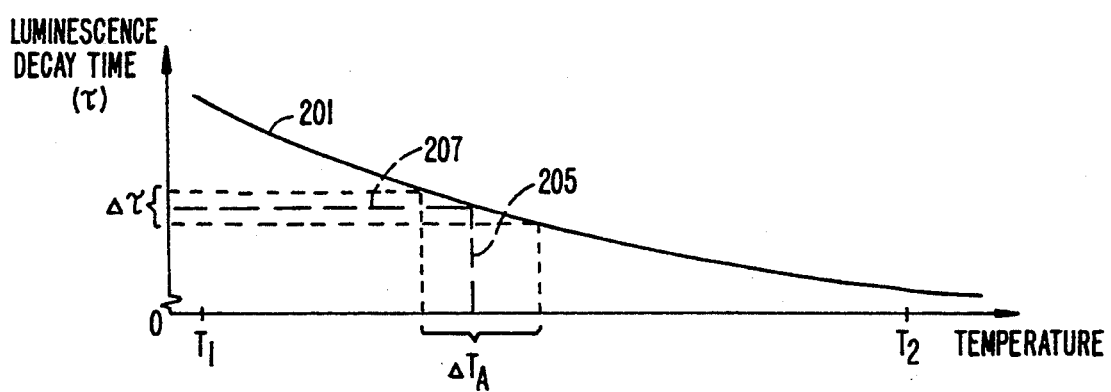
FIG. 2 shows luminescence emission characteristics of one example luminescent material for the sensor.
Figure 3:
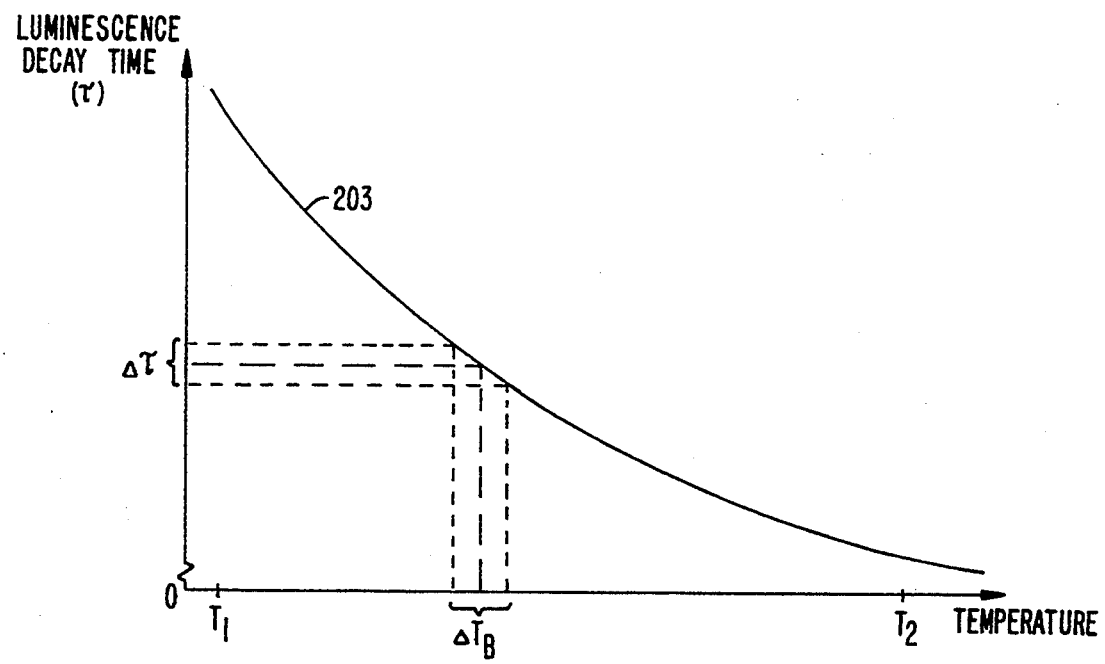
FIG. 3 shows luminescence emission characteristics of another example luminescent material for the sensor.

The techniques of the present invention for selecting a luminescent material having decay time versus temperature characteristics that are matched to the optical-electronic module will now be explained with respect to the graphs of FIG. 2–4. A curve 201 of FIG. 2 shows this relationship for an example luminescent material A. Similarly, a curve 203 of FIG. 3 shows this relationship for another luminescent material B. Although modified somewhat for ease of illustration, the curve 201 of FIG. 2 is intended to generally illustrate the Cr:YGG material discussed above that is utilized in the existing board based measuring system of Luxtron Corporation. The curve 203 is intended to illustrate a trivalent chromium doped yttrium aluminum garnet (Cr:YAG) luminescent material having a specific formulation described in aforementioned U.S. Pat. No. 5,107,445.

The vertical luminescent decay time scale of each of the curves of FIG. 2 and 3 has been made to be approximately the same, thus showing that the Cr:YAG material of FIG. 3 has a much higher sensitivity (rate of change or slope of the curve 203) than does the Cr:YGG material of FIG. 2. Indeed, the actual curve 201 for Cr:YGG material is flatter than that shown in FIG. 2 but has been illustrated with a greater slope herein for ease of illustration and explanation. As exemplary characteristics of the two luminescent materials, the decay time of Cr:YGG changes at the rate of about 1.4 micro-seconds per degree Celsius, when at room temperature (about 25 degrees Celsius), and the decay time of Cr:YAG changes at the rate of about 16 microseconds per degree Celsius when at that same temperature. It has been found, as a result of the techniques being described herein, that the Cr:YAG material illustrated in FIG. 3 is preferred for use with the current board based electro-optical module that is described above.

The desired matching of luminescent material characteristics with that of the electronic processing module will now be explained. Referring to FIG. 2, assume that luminescent material A within a sensor 25 of the system of FIG. 1 is being held at a temperature indicated by a vertical line 205. According to the characteristic curve 201 of that material, the system of FIG. 1 should, if perfect, measure the luminescent decay time to be a value indicated by a horizontal line 207. Although the luminescent material may be chosen to accurately exhibit the same decay time value upon repeated exposures to the same temperature, that is not the case with the electro-optical modules which measure that decay time. Variations in the performance of electronic and optical components used on different copies of the board 131 will result in some variation in the decay time measurement obtained for a single temperature. Also, variations in the temperature at which the board 131 is operated will also cause the same module to give different decay time readings for the same temperature to which the luminescent material sensor is subjected. Further, aging of the board 131 will likely result in changes.

As discussed earlier, these factors are believed to be the primary contributors to the variation of decay time measurements that have been observed when the sensor(s) is held at the same temperature. A likely range of measurements made with multiple boards in various temperature environments of a luminescent signal having a decay time corresponding to the temperature 205 is shown on FIG. 2 as $\Delta\tau$. As can be seen from FIG. 2, decay time measurements within the range $\Delta\tau$ will give on the display 48 (FIG. 1) temperature readings that extend within a range $\Delta T_A$. If the temperature increment $\Delta T_A$ is greater than the required accuracy of the system at the temperature 205, then the temperature measurement performance will not be acceptable.

Heretofore, it has been believed to be important to provide a high intensity luminescent signal from the sensor 25 to the photodetector 13 in order to improve the measurement precision. Therefore, a luminescent material such as Cr:YGG has heretofore been used because of its high brightness. However, the other factors being described herein are recognized, as part of the present invention, to be more important.

Further, it has heretofore been believed necessary to improve the optics and electronic on the board in order to improve system measurement accuracy. But this increases the cost of the boards at a time when widespread application of luminescent temperature measurement technology will likely be achieved only when the cost of the boards is reduced. Thus, it is desirable to further simplify the board, such as by eliminating the optical head 11 as such and replacing it with simpler optical fiber couplings, using a simpler electronic signal processing technique that reduces the number of components, and similar such changes. This trend will likely expand the spread $\Delta\tau$ rather than reduce it. Therefore, some other solution must be found.

That solution is to choose a luminescent material for the sensor 25 that has a very high sensitivity; that is, one that has a very steep characteristic decay time vs. temperature curve. The curve 203 of FIG. 3 illustrates such a characteristic. It can been seen from FIG. 3 that a temperature spread $\Delta T_B$ is less than the spread $\Delta T_A$ of FIG. 2, both resulting from the same spread $\Delta\tau$ of decay time measurements by the electro-optical board 131 (FIG. 1), because the luminescent material characteristic curve 203 is steeper (has a larger slope) than is the curve 201. It has thus been found that the luminescent material chosen for the sensor 25 should be selected from those with a high rate of change (sensitivity) of its decay time as a function of temperature.

Choosing a luminescent material having such a curve with an increased slope allows the board 131 to be further simplified, even though such simplifications might increase the magnitude of the $\Delta\tau$ spread. Use of a luminescent material with the steep characteristic curve reduces the effect on the temperature measurement spread $\Delta T_B$ of such an increase in the spread $\Delta\tau$.

Figure 4:
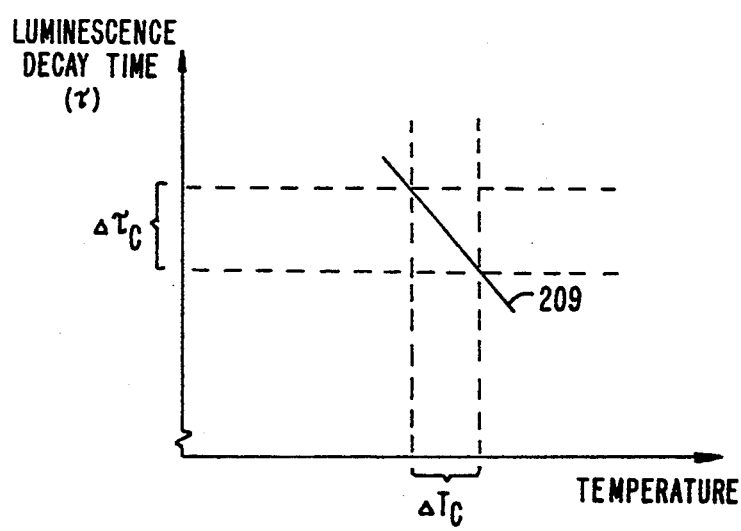
FIG. 4 is a graph that illustrates the proper selection of a luminescent material to match the characteristics of the accompanying electro-optic measuring module.

Referring to FIG. 4, a method is described for selecting luminescent material for use in the sensor 25 for a particular electro-optical module in the form of the board 131. A given board product will exhibit a spread $\Delta\tau_c$ in the measurement of decay times with the luminescent material at a constant temperature. This range $\Delta\tau_c$ is preferably chosen to be achievable with a nearly one-hundred percent manufacturing yield of the module boards. The extent of a temperature spread $\Delta T_c$ is chosen to meet customer requirements.

A line 209 of FIG. 4 extending between the intersections of the ranges $\Delta\tau_c$ and $\Delta T_c$ shows a minimum slope desired for the characteristic curve of a suitable luminescent material. The magnitude of the slope of the line 209 is a ratio of $\Delta\tau_c$ to $\Delta T_c$. That is, when the decay time vs. temperature characteristic curve of a luminescent material has the slope of the line 209, or greater, the boards exhibiting variations in decay time measurements over the range indicated by $\Delta\tau_c$ will cause temperature readings of the display 48 to vary over a range $\Delta T_c$ for a given temperature. Since $\Delta T_c$ controls the desired system temperature measurement accuracy, variations of the decay time measurements by the boards 131 within a range of $\Delta\tau_c$ then do not matter.

The discussion of an optimized temperature measurement system has been made with respect to a single temperature. Of course, it is desired that the same characteristic be maintained over the full temperature range of the instrument, this range being shown in FIGS. 2 and 3 as extending between the temperatures $T_1$ and $T_2$. In developing the requirements for a luminescent material in accordance with the technique illustrated in FIG. 4, the decay time vs. temperature characteristic of the selected luminescent material preferably has a slope throughout the operable temperature range of the system that exceeds the slope of the line 209.

Although the various aspects of the present invention have been described with respect to its preferred embodiments, it will be understood that the invention is entitled to protection within the full scope of the following claims.

It is claimed:

1. A method of optimizing the performance of a plurality of replicated units of a parameter measuring system that each have a combination of a luminescent material parameter sensor and an electro-optical module that measures a rate of decay of luminescence from the sensor that is related in a known manner to the parameter, wherein the sensor and electro-optical module optically communicate with each other for the purpose of measuring the parameter over a predetermined parameter range, comprising the steps of:

providing the electro-optical modules to provide, in response to receiving a plurality of individual values of rates of decay representing values of the parameter extending across said predetermined parameter range, a given range of measurements of the individual rate of decay values by either different ones of the plurality of modules or by one of said modules being operated under different environmental conditions, selecting an acceptable range of variations in the measurement of the parameter throughout the predetermined parameter range, determining the rate of decay of luminescence as a function of the parameter over said predetermined parameter range for each of a plurality of luminescent sensor materials having different chemical compositions, and selecting for use in the sensors one of said plurality of luminescent materials whose rate of decay function is characterized by having a slope throughout the predetermined parameter range that is substantially equal to or higher than a ratio of said given range of measurements of the individual rate of decay values to said acceptable range of variations in the measurement of the parameter.

2. The method according to claim 1 wherein the parameter being measured is the temperature of the sensor.

3. The method according to claim 1 wherein the electro-optical module is formed substantially entirely on a single printed circuit card, and the module and the sensor optically communicate over an optical fiber medium.

4. For a system of measuring temperature over a predetermined range of temperatures ($T_1$ to $T_2$) that includes an optical temperature sensor of luminescent material which is characterized by emitting, in response to excitation radiation, luminescent radiation having a rate of decay ($\tau$) that is related in a known manner to the temperature (T) of the sensor, and an electro-optic module optically connected with the sensor in order to measure the rate of decay of the luminescent radiation, a method of optimizing the performance of such a system, comprising the steps of:

ascertaining the rate of decay of luminescence radiation as a function of temperature (201, 203) over said predetermined range of temperatures for each of a plurality of luminescent materials having different chemical compositions, defining an acceptable range of variation ($\Delta T$) in the measurement of temperatures throughout said predetermined range of temperatures, providing the electro-optical module so that, in response to receiving specific values of luminescent radiation rates of decay corresponding to temperatures extending over said predetermined range of temperatures, either a plurality of modules constructed according to the design or a single module operated under different environmental conditions provide measurements of said specific rate of decay values that are spread over a defined range of variation ($\Delta \tau$), and selecting for the sensors one of said plurality of luminescent materials whose rate of decay function has a slope over said predetermined temperature range that is equal to or greater than a ratio of the defined range of decay time measurement variation ($\Delta \tau$) to the acceptable range of temperature measurement variation ($\Delta T$) over said predetermined temperature range.

5. The method according to claim 4 wherein the electro-optic module is formed substantially entirely on a single printed circuit card, and the module and the sensor are optically connected by a length of optical fiber.

* * * * *